United States Patent [19]

Bourdo

[11] 3,963,395
[45] June 15, 1976

[54] MASS PRODUCTION LINE FOR FABRICATING STRUCTURAL BUILDING MEMBERS

[75] Inventor: John Lorin Bourdo, Phoenix, Ariz.
[73] Assignee: Automated Construction Industries, Inc., Phoenix, Ariz.
[22] Filed: Feb. 25, 1974
[21] Appl. No.: 445,069

[52] U.S. Cl. .............................. 425/88; 264/46.4; 425/441; 425/451; 425/454; 425/817 R
[51] Int. Cl.² .......................................... B29D 27/00
[58] Field of Search ............ 425/88, 441, 443, 450, 425/451, 453, 454, 4 R, 817 R, 253, 254, 255, DIG. 200, DIG. 201, 442; 164/137, 339; 193/35 R, 37; 269/14, 31; 249/192; 264/46.5, 48, 54, 46.4

[56] References Cited
UNITED STATES PATENTS

| | | | |
|---|---|---|---|
| 2,990,929 | 7/1961 | Attwood | 193/35 R |
| 3,151,196 | 9/1964 | Tipton | 425/DIG. 201 |
| 3,233,285 | 2/1966 | Ludwig | 425/453 X |
| 3,362,674 | 1/1968 | Gilbert | 249/192 X |
| 3,407,457 | 10/1968 | Blom | 425/88 |
| 3,543,335 | 12/1970 | Meyer | 425/454 X |
| 3,604,497 | 9/1971 | Sylvester | 164/137 X |
| 3,640,335 | 2/1972 | Darbonville | 164/339 |
| 3,659,986 | 5/1972 | Gelbman | 425/454 X |
| 3,778,018 | 12/1973 | Abalo | 425/453 X |
| 3,813,463 | 5/1974 | Conger | 425/817 R X |

Primary Examiner—R. Spencer Annear
Assistant Examiner—Mark Rosenbaum
Attorney, Agent, or Firm—Ronald J. Clark

[57] ABSTRACT

An improved mass production assembly line is provided for fabricating building walls and similar structural members in molds by applying a hardenable polyester film to the cavity surfaces of mold halves, joining the mold halves and then introducing a mixture into the mold cavity to form a polyurethane foam.

First and second rectangular fields of rollers, each mounted on a pedestal, are adapted to carry respective mating halves of each mold in a horizontal plane from a start end of the fields to the terminating end. The mold cavities face upwardly. The lower surface of each mold half has secured thereto elongated T-shaped bars. The bars are parallel with each other, and each bar is adapted to be carried by one line of rollers in a respective one of the fields. The parallel axes of the rollers are set to an exact height by means of a laser light source and photoresponsive means so that the upper edges of the rollers lie in the same horizontal plane. The bars of each mold half have flat smooth lower edges lying in the same plane so that they support the large (eg 12 feet × 20 feet), thin-walled molds with minimum distortion. Minimum force is required of the workers for manually moving each mold along the field length or stopping it at work stations positioned along the field. A transfer mechanism at the terminating end of the fields receives each pair of mold halves on horizontal arms thereof. The arms include rows of rollers for receiving and suppoting the T-shaped bars and are pivotally mounted at their adjcent edges. The transfer mechanism moves the mold halves to a position adjacent to a foaming station; and the arms are pivoted to juxtaposed vertial positions to bring the mold halves together. The mold halves are secured to each other; and in this vertical position they are carried on an additional row of rollers on the transfer mechanism. The joined mold halves are manually moved over the latter rollers from the transfer mechanism to a row of supporting rollers on the floor of the foaming station. Rollers mounted on vertical axes in opposed vertical planes on either side of the floor roller support the mold halves for easy manual movement without falling over and prevent bulging of the mold halves due to high foaming pressures. Foam is applied to the cavity in the mold halves via an opening in the upper surface thereof. After the cavity is filled and the foaming action is completed, the mold halves are moved along the assembly line to a subsequent station where the mold halves are separated to remove the fabriated wall. An overhead crane is preferably used to pick up the mold halves at the foaming station and move them to the mold separation station.

7 Claims, 9 Drawing Figures

MASS PRODUCTION LINE FOR FABRICATING STRUCTURAL BUILDING MEMBERS

CROSS REFERENCE TO RELATED APPLICATION

The present application shows and describes structure which is claimed in a co-pending application, filed of even date herewith, assigned to the assignee of the present application and entitled "Transfer Mechanism for Structural Members."

BACKGROUND OF THE INVENTION

This invention relates to the production line fabrication of housing components such as walls, roofs and the like from polymers and foamed materials.

In the production of housing, more efficient production techniques have replaced to some extent the age-old method of construction at the site from individual boards, stones, and other parts. However, modern plastic materials, polymers and similar materials are not widely used as building materials, and the fabrication of walls, floors, roofs and similar elements from such materials is not satisfactorily efficient under prior techniques and results in deficiencies in the products.

Foamed plastic internal structures, such as of polyurethane foam, are recognized as desirable to provide excellent thermal insulation and satisfactory strength to the element at moderate cost.

These components are fabricated in large, unwieldy molds which must be handled without jarring or deformation. The present invention is directed specifically to a mass production line having means for supporting mating mold halves or they are moved from one work station to a second work station and having a transfer mechanism for receiving mating mold halves, pivoting the mold halves from horizontal to vertical positions for connection to each other, and for discharging the connected mold halves to the next work station.

SUMMARY OF THE INVENTION

It is therefore an object of the present invention to provide means for handling large, awkward mold halves.

It is a more specific object to provide an improved economical conveyor means and mold strengthening means cooperating with the conveyor means for ease of handling the molds.

It is an object to provide conveyor and strengthening means fabricated from low cost, easily accessible components.

It is a specific object of the present invention to provide an improved transfer mechanism for pivoting mating mold halves to engaging vertical positions to secure the halves together.

The objects of the invention are attained by providing rows of supporting assemblies, each assembly having a roller carried on a pedestal. Mold halves are carried horizontally on the rollers with their cavities facing upwardly. Rigid T-shaped bars are secured to the lower surfaces of the mold halves. Each T-shaped bar is adapted to ride on one of the rollers as it is moved through work stations. The transfer mechanism is positioned at the end of the supporting assemblies.

The improved transfer mechanism includes a supporting frame carried on a pair of parallel tracks. The tracks are positioned on the floor transverse to the direction of the field length. The frame has secured thereto a plurality of spaced metal wheels having V-shaped grooves around their circumference. The upper edges of the tracks have inverted V-shaped cross-sections for receiving the mating wheels. A manually operable hydraulic motor rotates a rubber-tired wheel which is rotatably mounted on the frame and held against the floor by spring tension, thereby to move the frame along the tracks in either direction.

A pair of arms are pivotally mounted on parallel horizontal axes adjacent each other near the center of the frame. Pairs of opposed telescoping hydraulic cylinder and ram assemblies are pivotally secured to the frame and to each arm, one pair at each arm end adjacent the arm pivot axis. A first assembly of each pair is secured to the frame on one side of the arm pivot axis; and the second assembly of each pair is secured to the frame below the arm pivot axis.

A manually controllable hydraulic pump delivers a drive fluid to move the cylinder and ram assemblies between their retracted and extended positions. When the first and second assemblies of each pair are in their retracted and extended positions respectively, the arms are held in a horizontal plane. The first assemblies are moved to their extended positions in unison to move the arms to their vertical positions, at which point the second assemblies (now in their retracted positions) resist further movement of the arms. When the first assemblies are retracted and the second assemblies are extended the arms are moved to their horizontal positions. The cylinders and ram assemblies thus control the movement of the arms between horizontal positions and juxtaposed vertical positions.

A pair of conveyors is carried on the upper surface of each arm for receiving the mold halves from the assembly line field of rollers. The T-shaped bars on the mold halves engage and ride on the conveyor. After the mold halves are received on the conveyors, the transfer mechanism is moved on the tracks from its position adjacent the field of rollers to a position adjacent the foaming station. The arms are moved by their cylinders and ram assemblies to their vertical positions, carrying the mold halves between them. A central conveyor carried by the frame receives and supports the mold halves in their vertical positions. The mold halves are secured to each other to form a cavity therein and are moved from the central conveyor to a conveyor on the floor of the foaming station. The arms are returned to their horizontal positions in preparation for receiving the next mold halves from the roller fields.

These and other objects, features, characteristics and advantages will be apparent by consideration of the following description of a preferred embodiment of the invention, as illustrated by the accompanying drawings.

DESCRIPTION OF THE PREFERRED EMBODIMENT

Co-pending applications entitled 'Fabrication of Structural members', Ser. No. 255,656, filed May 22, 1972, inactivated as of Feb. 25, 1974; Continuation-in-part, Ser. No. 260,904, filed June 8, 1972, inactivated as of Feb. 25, 1974; Continuation-in-part, Ser. No. 445,077, filed Feb. 25, 1974, still pending; Ser. No. 445,249, filed Feb. 25, 1974, issued into U.S. Pat. No. 3,890,075 on June 17, 1975 and assigned to the same assignee of the present application, describes and claims an improved process of fabricating builidng members such as walls. The improved apparatus of the present application is preferably used to implement said process in an efficient manner.

Briefly, said process requires an assembly line 1 (FIGS. 1a and 1b) through which mating mold frame halves 2a and 2b are moved more or less continuously from one station to another by operators. The mold halves 2a and 2b are initially positioned with their cavities facing upwardly to permit inserts such as 3 to be placed therein for forming windows and doors. As will be seen below, the lower or outer sides of the mold halves are carried by rows of pedestals 4 having rollers 5 rotatably carried at the upper ends thereof to form a mold conveyor system 6.

Figure 1:
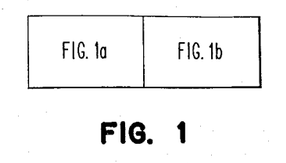
FIGS. 1a and 1b are illustrations of a production line incorporating the improved transfer mechanism of the present application and FIG. 1 shows the arrangement of FIGS. 1a and 1b.
Figure 1A:
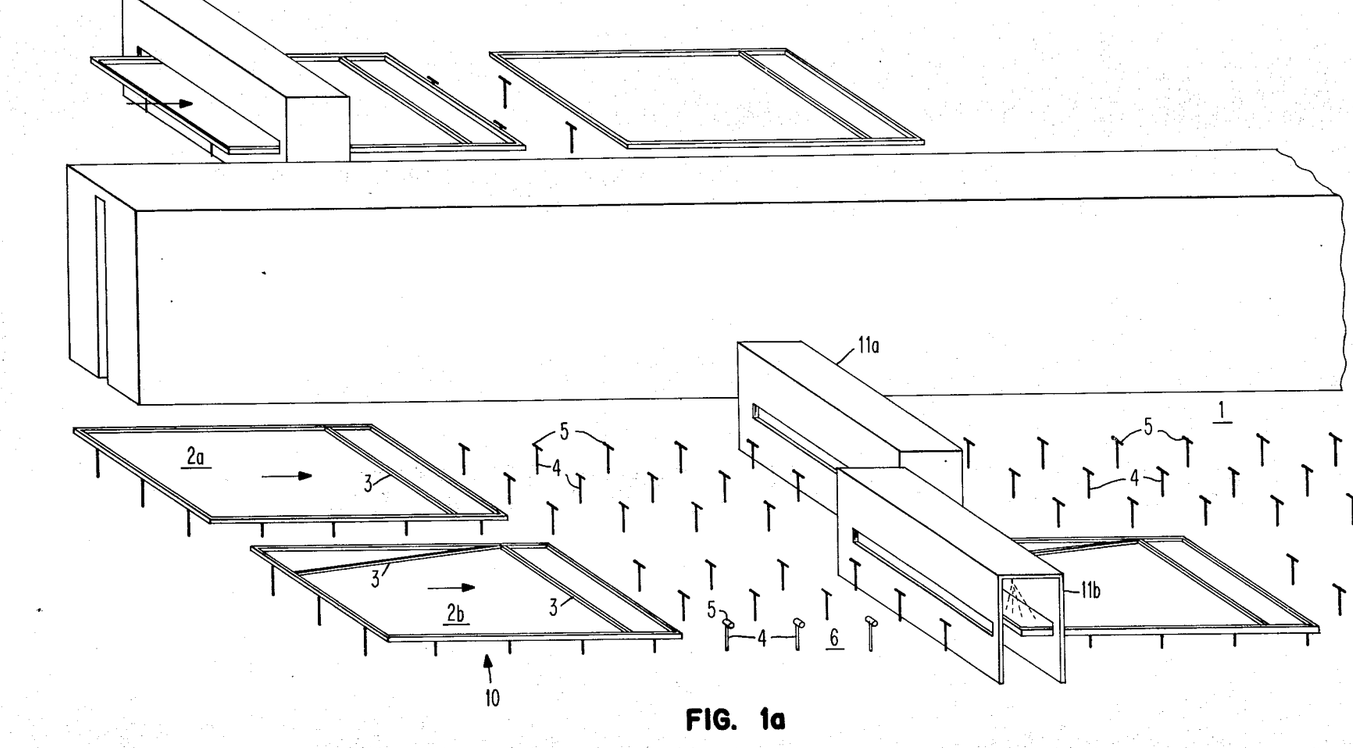
Figure 1B:
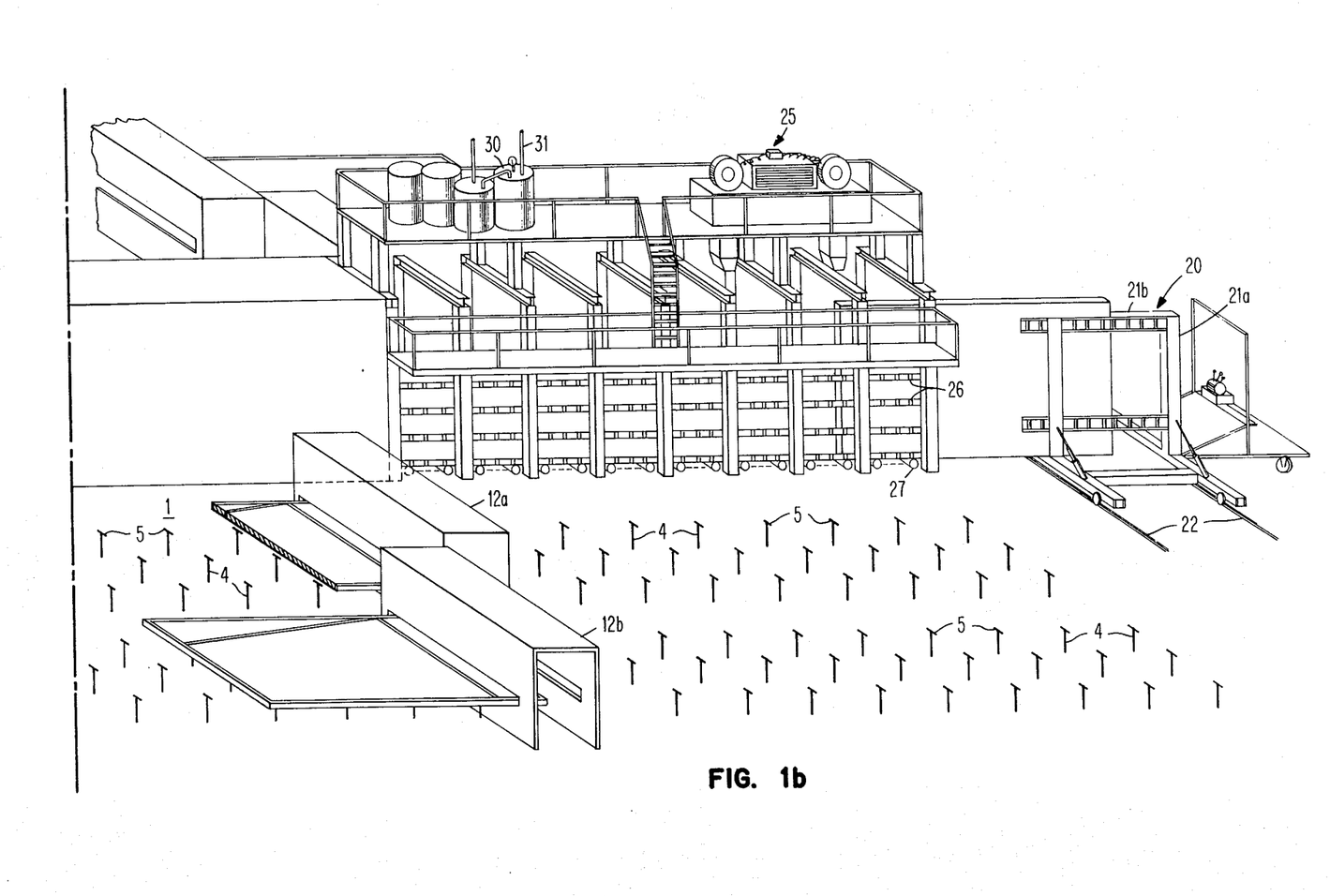

After the molds have received the inserts, they are sprayed or otherwise coated with a thin layer of wax at a wax application station 10 at one end of the conveyor system 6. The mold halves 2a and 2b are then moved to spray stations 11a and 11b at which applicators (not shown) are moved back and forth over the mold halves to apply a thin layer of a hardenable polyester material which preferably also contains fire-resistant filler, such as hydrate of alumina. Enclosed internal elements (not shown), such as electrical boxes, electrical conduits and water pipes are rested on the horizontal cavity surfaces of the mold halves 2a and 2b as the mold halves 2a and 2b are manually moved from the stations 11a and 11b to stations 12a and 12b. In the stations 12a and 12b, a second thin layer of hardenable material is applied over the mold cavities and the internal elements therein. This second layer preferably includes chopped glass fiber as a filler in a hardenable polyester resin. The mold halves 2a and 2b are moved slowly and continuously to the righthand end of the conveyor system 6.

An improved transfer mechanism 20 is positioned adjacent to the end of the conveyor system 6 to receive the mating mold halves 2a and 2b on a pair of horizontally positioned swing frame assemblies 21a and 21b. The swing frame assemblies 21a and 21b are pivoted from their horizontal positions to their vertical positions to bring the mating mold halves 2a and 2b into engagement with each other in an upright position between the swing frame assemblies 21a and 21b. In this upright position, the mating mold halves 2a and 2b are clamped together to form a central cavity therein between the two polyester skins which have been formed therein.

The transfer mechanism 20 is carried on a pair of rails 22 preferably which run in a direction transverse to that of the conveyor system 6. Prior to pivoting of the swing frame assemblies 21a and 21b to their vertical positions, the transfer mechanism 20 is moved along the rails 22 to a position adjacent a foaming station 25. The foaming station 25 includes two juxtaposed planes of vertically disposed rollers 26, adapted to receive therebetween the mold halves 2a and 2b, which have been clamped together. An additional row of rollers 27 disposed at the bottom of the foaming station 25 supports the lower edges of the mating molds 2a and 2b as they are moved between the roller planes 26. In the preferred embodiment, the foaming station 25 also includes a curing oven which can be comprised of electrical heating elements (not shown). The oven applies a temperature environment of 150° F to promote the further curing of the polyester resin skins. This pre-heating of the mold halves 2a and 2b to an elevated temperature improves the resulting bond between the foam and the polyester skins as described more fully in the above identified co-pending application.

In the foaming station 25 the foaming material is transferred from containers 30 into the cavity of the mold halves 2a and 2b by way of pipes or hoses 31 through two or more open ports (not shown) in the top edge of the mold halves. The preferred material is one which reacts exothermically while in the molds to produce a foamed polyurethane. Injection of the material is preferably by a machine-controlled froth or pour method of a pre-measured amount for the particular mold. The operator need only note the mold type and punch a selected button to dispense the proper amount. Injection is at not more than 50 pounds per minute per port to prevent splashing.

Since the mold halves are carried in upright positions at the foaming station, the material drops between the coated cavity walls. The automatic foaming reaction proceeds, the foamed product rises to the top and a surplus portion thereof may expand out through the open ports and is subsequently trimmed away.

The processed foaming operation and product are generally conventional. The foam rises freely to form a foam solid of final weight density of 2.4 to 2.5 pounds per square foot. The reaction is self-initiating and substantiating and is exothermic. Temperatures within the mold halves 2a and 2b rise to about 300°F. The reaction is fully completed in about 25 minutes while internal pressure rises to 15 pounds per square inch in 5 to 8 minutes and drops to 0 pounds per square inch within the 25 minutes.

The planes of rollers, such as 26, are positioned sufficiently close to each other both vertically and horizontally so that they provide support to the enlarged surfaces of the mold halves 2a and 2b when they are subjected to the 15 pound per square inch pressures. Thus, they provide the dual function of preventing bursting of the mold halves 2a and 2b as well as providing relatively frictionless movement of these enlarged mold halves 2a and 2b in vertical positions through the foaming station 25. The mold halves 2a and 2b are held between the roller planes, such as 26, for 30 to 35 minutes to assure that complete curing has occurred before the roller support is removed. In the event that it is desired to move the mold halves 2a and 2b from the foaming station as soon as possible to make room for a second set of mold halves, the plane of rollers 26 can be extended toward the left with respect to FIGS. 1a and 1b as far as is required.

Adjacent the conveyor system 6, the mold halves 2a and 2b may then be picked up by an overhead crane assembly (not shown) and transported to a station (not shown) in which the mold halves 2a and 2b are separated from each other, and the finished wall is removed. This latter station is preferably in the vicinity of the wax application station 10 so that the mold halves 2a and 2b can be cleaned and reused on the assembly line 1 in a rather continuous fashion.

Figure 3:
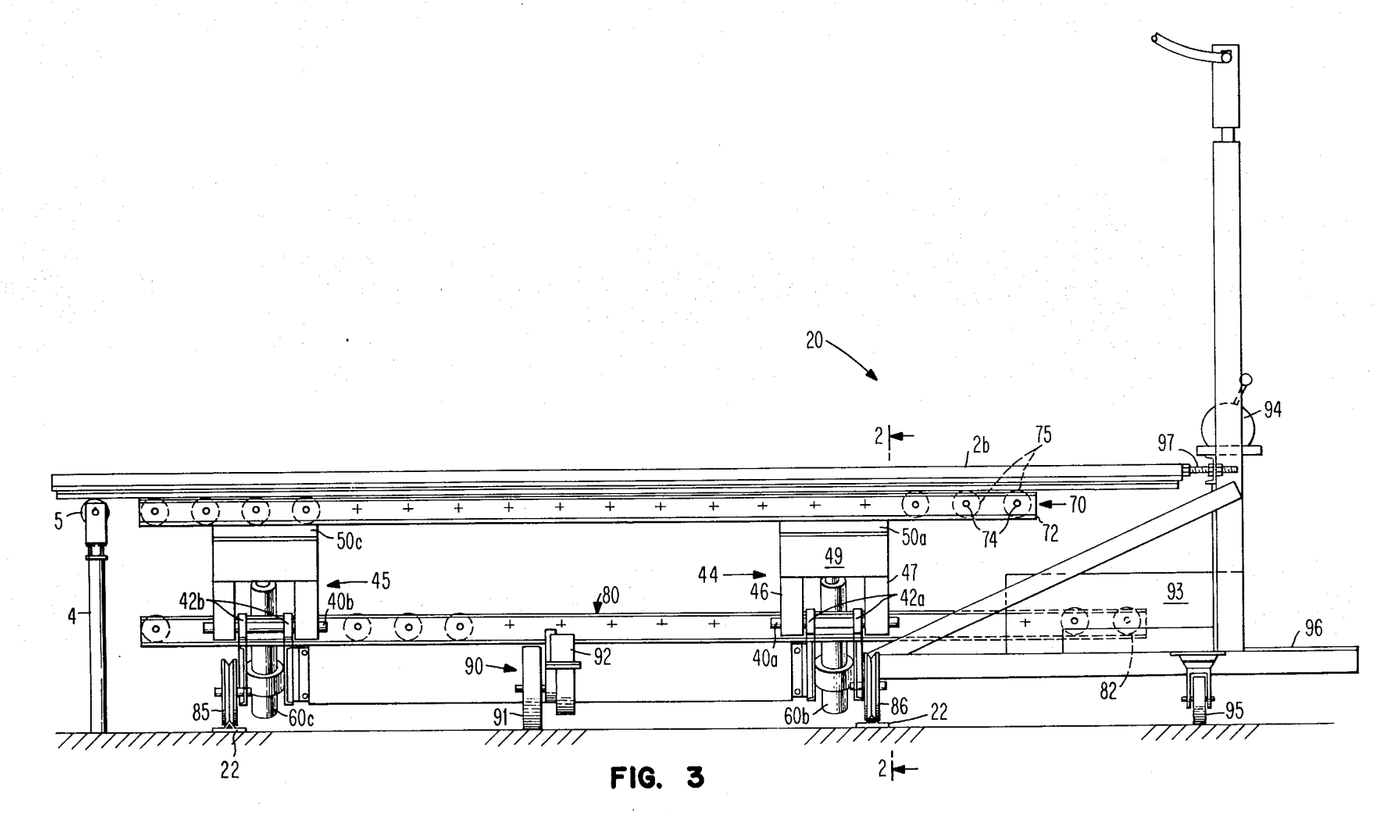
Figure 4:
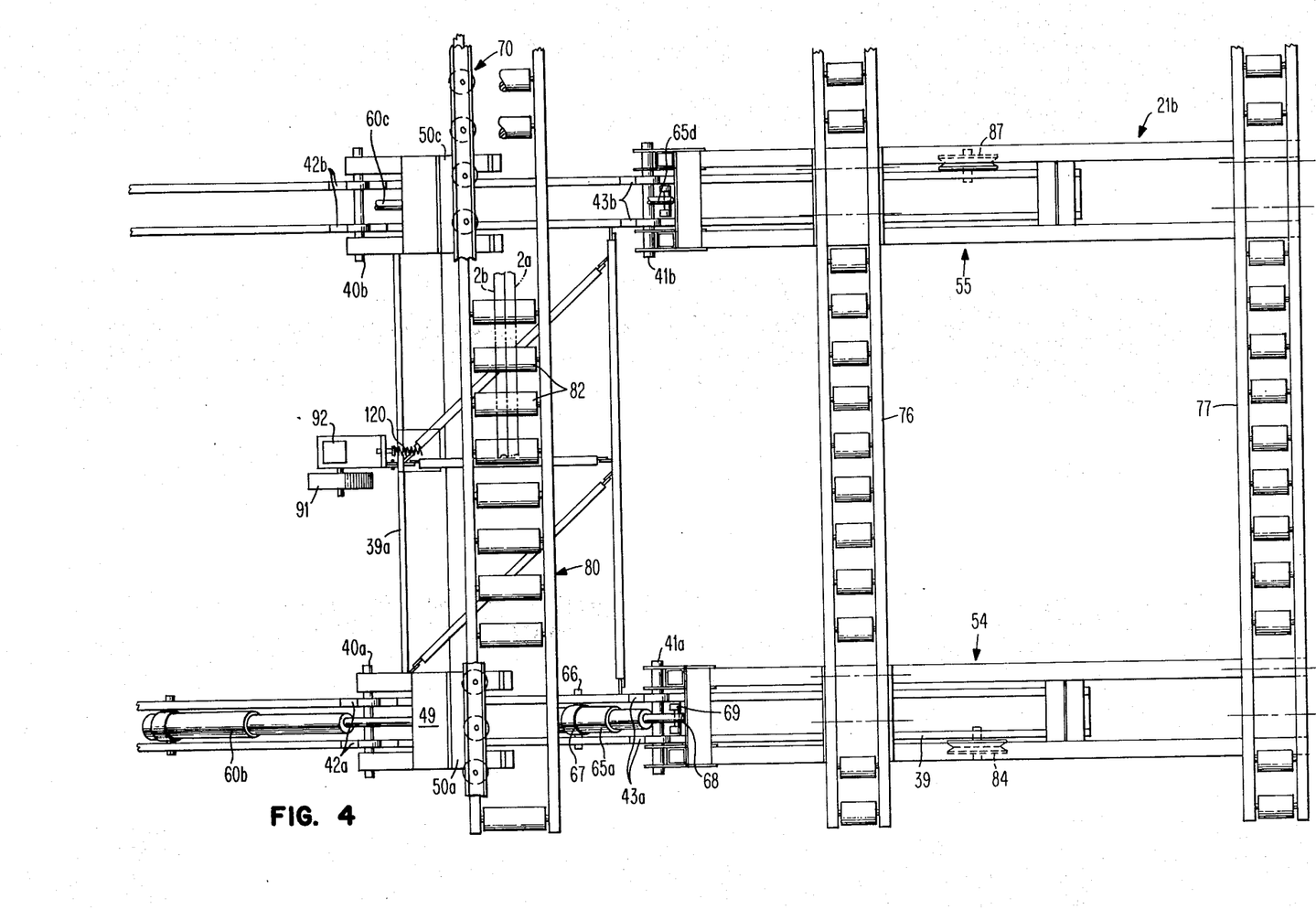

The improved transfer mechanism 20 will now be described in greater detail, reference being directed to FIGS. 2, 3 and 4. As described above, the transfer mechanism 20 comprises a pair of swing frame assemblies 21a and 21b. The swing frame assemblies are pivotedly mounted on hinge pins 40a, 40b, 41a and 41b carried by pillow blocks 42a, 42b, and 43a respectively. The swing frame assembly 21a comprises a pair of arms 44 and 45 (FIG. 3), each of which is similar and each of which is carried on a respective coaxial hinge pin 40a and 40b, which in turn are carried by the pillow blocks 42a and 42b. The swing arm 44 comprises a spaced pair of triangular members 46 and 47, preferably having tubular steel elements which are rectangular in cross-section. The tubular steel elements of the member 47 are welded to each other at their ends (FIG. 3) and are provided added strength by intermediate elements 48a and 48b. The intermediate elements 48 a and 48b are also comprised of tubular steel welded at the ends thereof to the triangular member 47. The spaced triangular members 46 and 47 are secured together by means of a plate 49 welded to the outer extremity of the member and by mounting plates 50a and 50b which are welded to the inner edges of the member 47 as seen in its vertical position in FIG. 2. As seen in FIGS. 3 and 4 similar plates such as 50c are welded to the swing arm 45. The member 46 of the swing arm 44 is identical in construction to the member 47 and will not, therefore, be described in further detail.

The swing arm 45 is identical in construction to the swing arm 44 and will not, therefore, be described in further detail. Swing frame assembly 21b included similar arms 54, 55 (FIG. 4) and is a mirror image of assembly 21a.

Figure 2:
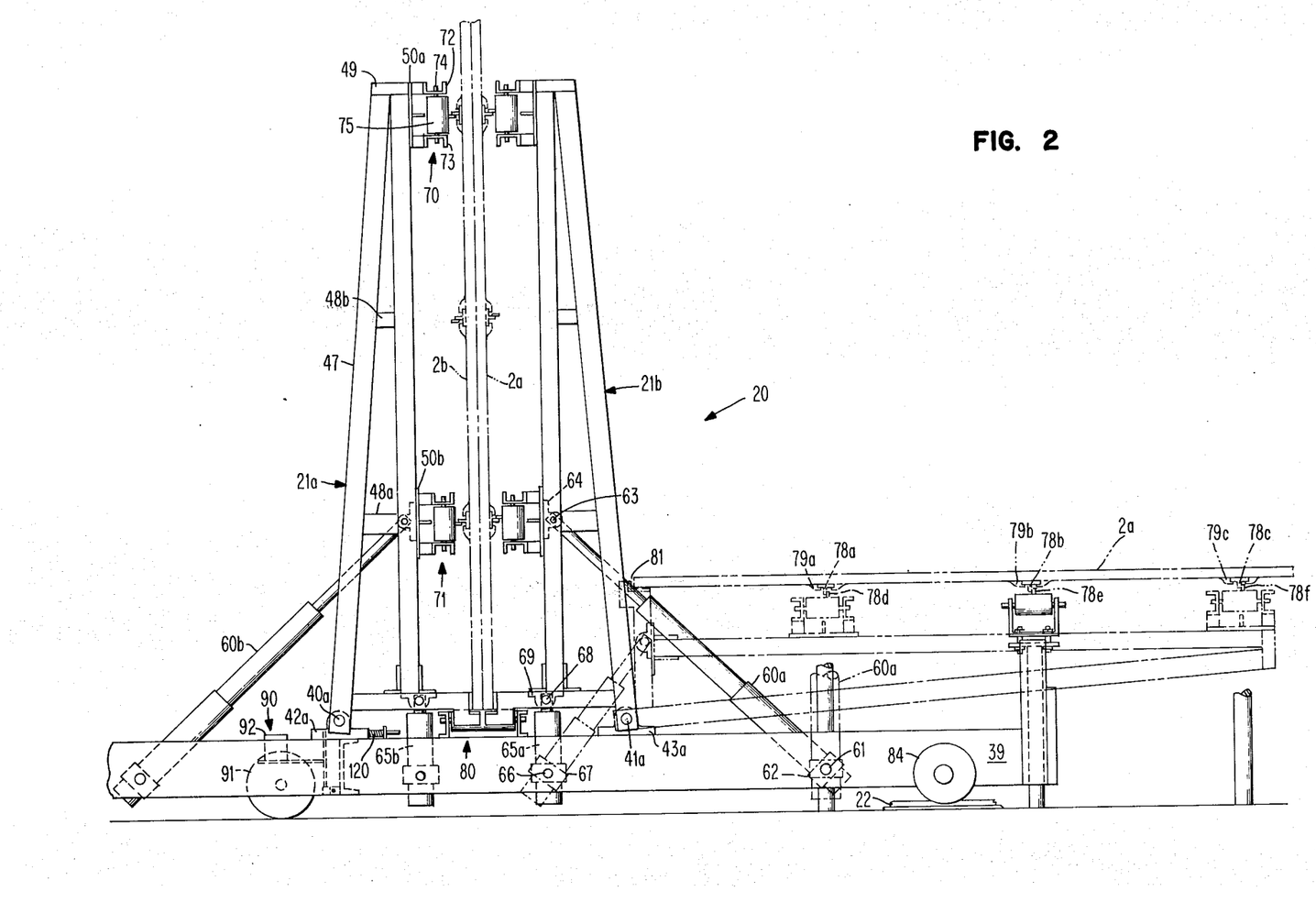
FIGS. 2, 3 and 4 are fragmentary front and side elevation views and a plan view of the improved transfer mechanism.

As indicated above, the swing frame assemblies 21a and 21b are pivotedly carried by the hinge pins such as 41a, 41b, 40a and 40b for movement from the vertical solid line positions shown in 2 to the horizontal positions shown by broken line in FIG. 2. FIG. 4 shows the swing frame assembly 21b in its horizontal position and assembly 21a in its vertical position. It will be appreciated that this is for convenience of illustration only. In actual operation, the assemblies 21a and 21b are always in vertical positions together or in horizontal positions together. The means for controlling the movement of the swing frame assembly 21b between these horizontal and vertical positions will now be described in detail.

A first telescoping hydraulic ram and cylinder assembly 60a is pivotally carried by a hinge pin 61 and trunnion 62 on the main frame 39 of the transfer mechanism 20. The opposite end of the assembly 60a is pivotally connected to the swing frame assembly 21b by means including pivot pins such as pin 63 and pillow blocks such as block 64 (FIG. 2). When the ram and cylinder assembly 60a is hydraulically actuated to its extended position shown in solid line in FIG. 2, it moves the swing frame assembly 21b to the vertical position. When the assembly is in its retracted position illustrated by broken line in FIG. 2, the swing frame assembly 21b is moved to its horizontal position.

A second ram and cylinder assembly 65a is pivotally carried on the main frame 39 by a pivot pin 66 and a trunnion 67. The opposite end of the assembly 65a is pivotally connected to the swing frame assembly 21b by means of a hinge pin 68 and a pillow block 69. In its extended and retracted positions respectively, the assembly 65a maintains the swing frame assembly 21b in its horizontal and vertical positions respectively.

When the ram and cylinder assembly 60a is hydraulically actuated to move the swing frame assembly 21b from its horizontal to its vertical position, the ram and cylinder assembly 65a is hydraulically controlled to retract causing the swing frame assembly to move more steadily. When the swing frame assembly 21b reaches the vertical position shown in FIG. 2, the ram and cylinder assembly 65 resists further counterclockwise movement of the swing frame assembly 21b and maintains the assembly steady in its vertical position.

Similar pairs of ram and cylinder assemblies 60b, 65b, 60c, 65c, and 65d are provided for each of the two swing arms 44, 45, 54 and 55 of each of the swing frame assemblies 21a and 21b. They are identically connected to their respective swing arms and will not be further described in detail. The swing frame assemblies 21a and 21b are mirror images of each other; they are fabricated in the same way, and are hydraulically actuated between their horizontal and vertical positions in the same way. A description of the details of both swing frame assemblies 21a and 21b will, therefore, not be made.

Each of the plates 50a and 50b have conveyor assemblies 70 and 71 secured thereto. The conveyor assembly 70 comprises a pair of elongated U-shaped members 72 and 73 secured to the plates 50a and 50c. Pivot pins such as pin 74 are secured between and carried by the members 72 and 73 on spaced parallel axes. Each of the pins such as 74 carries rotatable rollers such as roller 75. The rollers 75 support the mold halves as they are received on the transfer mechanism 20.

The conveyor assembly 71 is similar to the conveyor assembly 70 and will not be described in detail. Similar conveyor assemblies 76 and 77 are carried by arms 54, 55 of the swing frame assembly 21b as seen in FIG. 4. An additional conveyor assembly 80 similar in construction to the conveyor assembly 70 is carried by the main frame 39 between the swing frame assemblies 21a and 21b. When the mold halves 2a and 2b are raised by the swing frame assemblies 21a and 21b to their vertical positions as shown in FIG. 2, then each of the mold halves comes to rest on the conveyor assembly 80. Shoulders, such as shoulders 81, on swing frame assembly 21b support the mold halves as the molds halves are raised toward their vertical positions until such time as the lower edges of the mold halves engage the upper edges of the rollers 82 of the conveyor assembly 80.

In the preferred embodiment, the mold halves such as 2a (FIG. 2) have three T-shaped members 78a, 78b, 78c, received in channels 79a, 79b, 79c extending the entire length of the mold half. The members 78a, 78b, 78c are rigid steel rails which prevent deformation of the mold half 2a and which ride with little friction over the rollers 5 of field 6 (FIGS. 1a, 1b) and over the roller assemblies 76, 77. Since the lower surface of the mold 2a may not be perfectly level, the members 78a, 78b, 78c have extentions 78d, 78e, 78f welded thereto to provide leveling of the mold half as it rides on rollers 5. The members 78a, 78b, 78c also prevent the mold surfaces from bowing outwardly when the molds are vertically disposed, particularly in the foaming station where internal pressures are generated.

The main frame 39 is carried by four wheels, such as wheels 84, 85, 86 and 87 rotatably mounted on the main frame 39. The wheels mate with and ride on the upper surfaces of the tracks 22.

The transfer mechanism 20 is moved between the various positions described with respect to FIGS. 1a and 1b by means of a drive mechanism 90, including a rubber-tired wheel 91 rotated in the direction desired by means including a hydraulic motor 92. This drive mechanism 90 will be described in greater detail below with respect to FIG. 7. A hydraulic pump and actuating electric motor (not shown) in an oil tank 93 (FIG. 3) supply the drive fluid to the hydraulic motor 92. The pump and motor are in turn controlled by manually actuated control means 94. The oil tank 93 and the control means 94 are carried in an operator station on the transfer mechanism 20.

The operator station is secured to the main frame 39 in any well-known manner and is supported intermediate the ends thereof by a wheel 95 and further includes a platform 96 for the operator. The operator station also includes as a part thereof adjustable mold stop assemblies 97 which align the edges of the mating mold halves so that they will be properly positioned for connection in their vertical positions.

Figure 7:
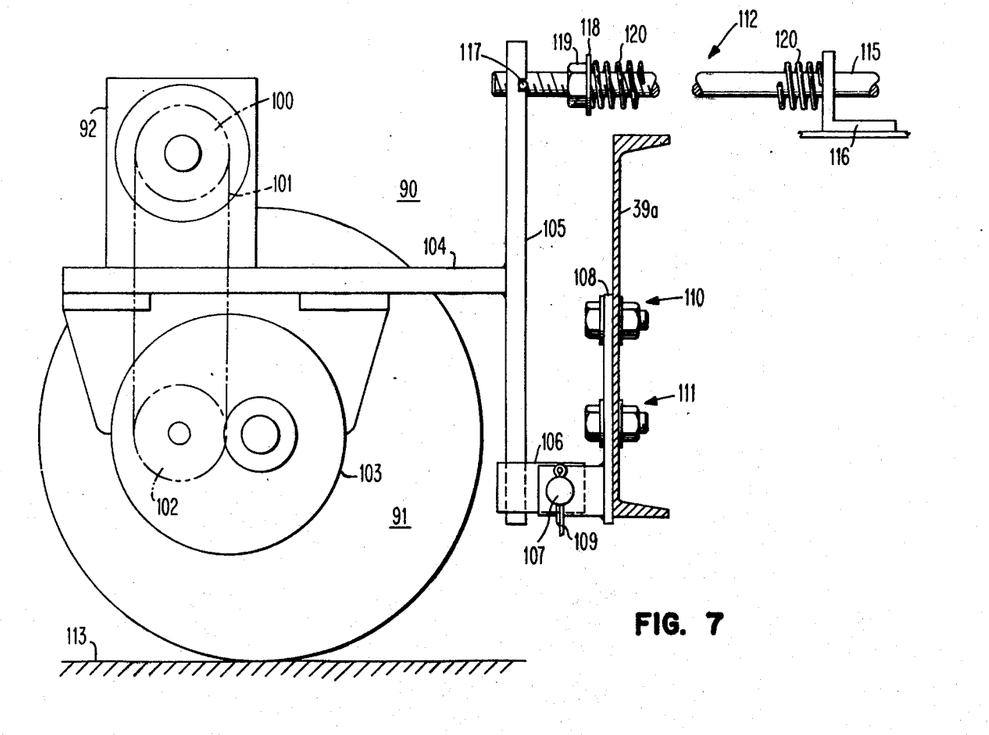
FIG. 7 is an enlarged side elevation view of the rubber-tired wheel and its actuating support mechanisms.

FIG. 7 illustrates the drive mechanism 90 in greater detail. The hydraulic motor 92 drives the tire 91 by way of a sprocket 100, a roller chain 101, a lower sprocket 102 and a reduction gear mechanism 103, preferably with a 30 to 1 ratio. The drive mechanism 90 is pivotally secured to a cross member 39a of the main frame 39. The pivotal connection comprises horizontal and vertical bars 104 and 105 welded to each other and welded to the housing of the hydraulic motor 92 and the reduction gear mechanism 103. A rectangular plate 106 welded to the lower end of the bar 105 receives a pivot pin 107 therethrough. An L-shaped bracket assembly 108 also receives the pivot pin 107; and cotter pins such as 109 retain the pin 107 in the plate 106 and the bracket assembly 108. The bracket assembly 108 is rigidly secured to the cross member 39a by means of a pair of bolt and nut assemblies 110 and 111.

A spring assembly 112 urges the tire 91 counterclockwise around pin 107 and against the floor 113. The assembly 112 includes an adjustable screw 115 received through a threaded opening in an L-shaped member 116 rigidly secured to the frame 39. The opposite end of the screw 115 is received through an opening in the upper end of the member 105 and a set screw 117 secures the screw 116 in the bar 105. A washer 118 and a nut 119 control the compression in a spring 120 received on the screw 115 between the member 116 and washer 118.

Figure 5:
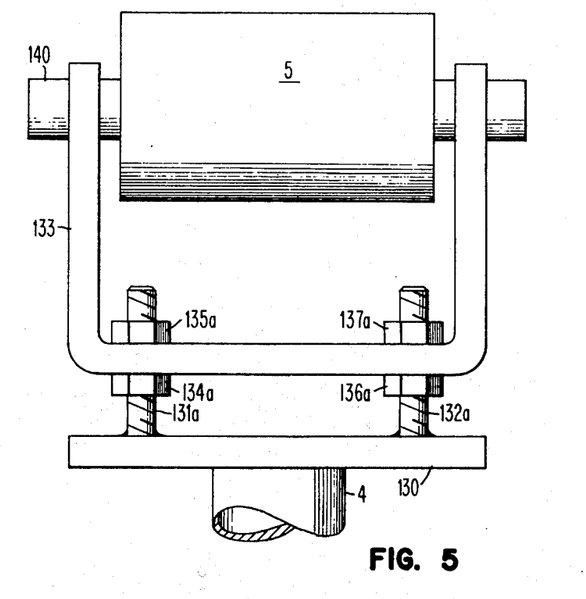
FIGS. 5 and 6 are enlarged front and side fragmentary elevation views of a roller in the field of rollers and the pedestal supporting the roller.
Figure 6:
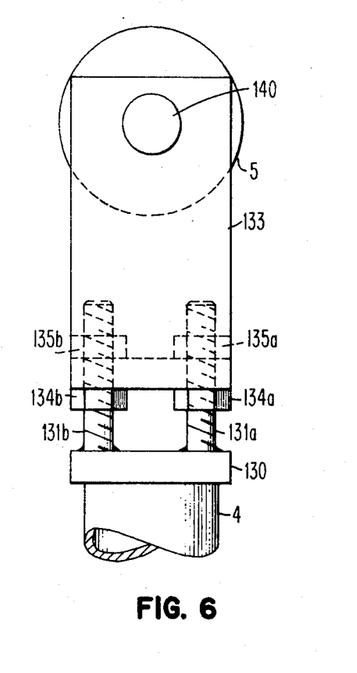

FIGS. 5 and 6 show the pedestal 4 and roller 5 in greater detail together with a preferred means for coupling the two to each other. A rectangular plate 130 is welded to the upper end of the pedestal 5. Pairs of bolts 131a, 131b, 132a and 132b (not shown) are welded to the upper surface of the plate 130. A generally U-shaped bracket 133 is carried on the bolts 131a, 131b, 132a and 132b by means of nuts 134a, 134b, 135a, 135, 136a, 136b (not shown), 137a and 137b (not shown). The upper free ends of the bracket 133 carry a pivot pin 140 upon which the roller 5 is rotatably received.

As indicated earlier, the upper edge of the roller 5 is carefully adjusted to be perfectly horizontal and to be at an accurately determined height above the floor surface. This is achieved by using a laser source of coherent light (not shown) and conventional electronic scanning means (not shown) to indicate when the roller is at said height. Tightening of the nuts 134a, 134b, 135a, 135b, 136a, 136b and 137a, 137b maintains the roller 5 in the adjusted position.

Various changes and modifications of the preferred embodiment of the invention described will be apparent to those of ordinary skill in the art; and it is intended that such changes and modifications are covered by the appended claims.

I claim:

1. In a production line for fabricating structural building members in mold halves moved through a series of fabrication work stations, the combination comprising:
    parallel rows of mold half supporting assemblies positioned in and between the work stations for carrying mold halves in horizontal positions with upwardly facing cavities;
    each of said assemblies including roller means, and each of such assemblies supporting said roller means for rotation about an axis in the same horizontal plane as all other assembly roller means; and
    each mating mold half having, on its side opposite the cavity, a plurality of rigid, parallel upright T-shaped bars inhibiting warping of the mold half, the lower edge of each bar adapted to engage and ride on a respective row of supporting assemblies with minimum friction; and on elongated rectangular bar with a slight lower edge welded to the lower edge of each T-shaped bar parallel and level with all other rectangular bar lower edges irrespective of misalignment between T-shaped bar edge due to irregularities in the mold half.

2. A mass production line for fabricating structural building members having outer layers of hardened polyester filled with polyurethane foam comprising;
    a first station including means for applying a layer of wax to the inner cavity surfaces of a pair of mating molds,
    a second station including means for spraying a coating of hardenable polyester over the wax layer,
    a third station including means for spraying a mixture of chopped glass fiber and hardenable polyester resin over the polyester coating,
    a foaming station,
    a mold transfer station having upper roller means for receiving the mating mold halves side by side in horizontal positions, having pivotal members carrying the latter roller means for moving the mold halves to vertical abutting positions in which they are joined together, having means for moving the mold halves to a position adjacent the foaming station, and having lower conveyor roller means for supporting said joined mold halves in their vertical positions,
    said foaming station including roller means for receiving and supporting the lower edges and sides of the joined mold halves in their vertical positions and including means for introducing into the mold cavity a material which reacts exothermically while in the mold cavity to produce a foamed polyurethane, and
    rows of mold supporting assemblies positioned in and between said first, second and third stations and between said third station and said transfer station for supporting the mold halves in horizontal positions with the cavities facing upwardly, each supporting assembly including a roller and a pedestal supporting the roller for rotation about a horizontal axis in the same horizontal planes as all other assembly rollers, each said mating mold half having, on the outer surface thereof opposite its cavity, a plurality of elongated outwardly extending T-shaped bars inhibiting warping of the mold half, the outer edge of each bar adapted to engage and roll on a respective row of assembly rollers with minimum friction and adapted to engage the upper roller means in the transfer station and the side supporting rollers in the foaming station.

3. A mass production line for transporting molds for fabricating structural building members having outer layers of hardened polyester filled with polyurethane foam, comprising:

first and second pluralities of vertical mold supporting assemblies arranged in a first and second generally rectangular fields of longitudinal work flow direction columns and transverse rows, each assembly including a roller and means rotatably supporting the roller on a horizontal axis perpendicular to the longitudinal direction of the field, and in the same horizontal plane as the other rollers, first and second mating mold halves adapted to be received on the first and second pluralities of supporting assemblies at one end of the respective fields and to be moved on the respective assemblies in the longitudinal direction to the opposite ends of the fields, each mold half having on the bottom thereof a plurality of elongated upright T-shaped bars inhibiting warping of the mold, the lower horizontal edge of which bars engage and roll on the rollers of a respective column as the mold moves in the field from said one end to the opposite end, spraying stations in said fields intermediate said one and opposite ends including means for applying hardenable polyester to the inside surfaces of the mold halves, a transfer mechanism having a pair of support structures, a frame, means pivotally mounting the structures on the frame on axes parallel to the longitudinal direction of the fields, means for moving the support structures from horizontal positions in the same plane as the rollers to opposed vertical positions, and rollers carried by the support structures on axes perpendicular to said longitudinal direction and adapted, when the support structures are in said horizontal positions, to receive thereon the T-shaped bars of respective mold halves from the first and second fields as the mold halves reach said opposite ends of the fields, means for moving the transfer mechanism from a first position, adjacent said opposite ends for receiving said pair of mating molds, to a second position.

means for joining the mating mold halves together after they are carried by the support structures to upright juxtaposed positions, a mold receiving and transporting mechanism comprising a lower horizontal row of rollers for receiving and supporting joined mold halves from the transfer mechanism in its second position, means for injecting the polyurethane foam into the interior of the joined mold halves while they are on said receiving and transporting mechanism, and means for transporting the joined mold halves from the foaming station.

4. A mass production line for fabricating structural building members having outer layers of hardened polyester filled with polyurethane foam comprising:

a first station including means for spraying a coating of hardenable polyester over the inner cavity surfaces of a pair of mating molds;

a second station including means for spraying a mixture of chopped glass fiber and hardenable polyester resin over the polyester coating;

a foaming station;

transfer means for receiving the mating mold halves side by side in horizontal positions, and having means for moving the mold halves to vertical abutting positions in which they are joined together;

said foaming station including roller means for receiving and supporting the lower edges and sides of the joined mold halves in their vertical positions and including means for introducing into the mold cavity a material which reacts exothermically while in the mold cavity to produce a foamed polyurethane;

rows of mold supporting assemblies positioned in and between said first and second stations and between said second station and said transfer means for supporting the mold halves in horizontal positions with the cavities facing upwardly;

each supporting assembly including a roller and a pedestal supporting the roller for rotation about a horizontal axis in the same horizontal planes as all other assembly rollers; and each said mating mold half having, on the outer surface thereof opposite its cavity, a plurality of elongated outwardly extending T-shaped bars inhibiting warping of the mold half, the outer edge of each bar adapted to engage and roll on a respective row of assembly rollers with minimum friction and adapted to engage the upper roller means in the transfer station and the side supporting rollers in the foaming station.

5. A mass production line for fabricating structural building members having outer layers of hardened polyester filled with polyurethane foam comprising:

a first station including means for spraying a coating of hardenable polyester over the inner cavity surfaces of a pair of mating molds;

a second station including means for spraying a mixture of chopped glass fiber and hardenable polyester resin over the polyester coating;

a foaming station;

a mold transfer station having upper roller means for receiving the mating mold halves side by side in horizontal positions, having pivotal members carrying the latter roller means for moving the mold halves to vertical abutting positions in which they are joined together, having means for moving the mold halves to a position adjacent the foaming station, and having lower conveyor roller means for supporting said joined mold halves in their vertical positions;

said foaming station including roller means for receiving and supporting the lower edges and sides of the joined mold halves in their vertical positions and including means for introducing into the mold cavity a material which reacts exothermically while in the mold cavity to produce a foamed polyurethane; and rows of supporting assemblies positioned in and between said first and second stations and between said second station and said transfer station for supporting the mold halves in horizontal positions with the cavities facing upwardly;

each supporting assembly including a roller and a pedestal supporting the roller for rotation about a horizontal axis in the same horizontal planes as all other assembly rollers;

each said mating mold half having, on the outer surface thereof opposite its cavity, a plurality of elongaged outwardly extending T-shaped bars inhibiting warping of the mold half, the outer edge of each bar adapted to engage and roll on a respective row of assembly rollers with minimum friction and adapted to engage the upper roller means in the transfer station and the side supporting rollers in the foaming station.

6. A mass production line for transporting molds for fabricating structural building members having outer layers of hardened polyester filled with polyurethane foam, comprising:

first and second pluralities of vertical mold supporting assemblies arranged in a first and second generally rectangular fields of longitudinal work flow direction columns and transverse rows;

each assembly including a roller and means rotatably supporting the roller on a horizontal axis perpendicular to the longitudinal direction of the field, and in the same horizontal plane as the other rollers;

first and second mating mold halves adapted to be received on the first and second pluralities of supporting assemblies at one end of the respective fields and to be moved on the respective assemblies in the longitudinal direction to the opposite ends of the fields;

each mold half having on the bottom thereof a plurality of elongated upright T-shaped bars inhibiting warping of the mold, the lower horizontal edges of which bars engage and roll on the rollers of a respective column as the mold moves in the field from said one end to the opposite end;

at least one spraying station in said fields intermediate said one and opposite ends including means for applying a mixture of hardenable polyester and fiberglass to the inside surfaces of the mold halves;

a transfer mechanism having a pair of support structures, a frame, means pivotally mounting the structures on the frame on axes parallel to the longitudinal direction of the fields, means for moving the support structures from horizontal positions in the same plane as the rollers to opposed vertical positions, and rollers carried by the support structures on axes perpendicular to said longitudinal direction and adapted, when the support structures are in said horizontal positions, to receive thereon the T-shaped bars of respective mold halves from the first and second fields as the mold halves reach said opposite ends of the fields;

means for moving the transfer mechanism from a first position, adjacent said opposite ends of receiving said pair of mating molds, to a second position;

means for joining the mating mold halves together after they are carried by the support structures to upright juxtaposed positions;

a mold receiving and transporting mechanism comprising a lower horizontal row of rollers for receiving and supporting joined mold halves from the transfer mechanism in its second position;

means for injecting the polyurethane foam into the interior of the joined mold halves while they are on said receiving and transporting mechanism; and means for transporting the joined mold halves from the foaming station.

7. A mass production line for transporting molds for fabricating structural building members having outer layers of hardened polyester filled with polyurethane foam, comprising:

first pluralities of vertical mold supporting assemblies arranged in a first generally rectangular field of longitudinal work flow direction columns and transverse rows;

each assembly including a roller and means rotatably supporting the roller on a horizontal axis perpendicular to the longitudinal direction of the field, and in the same horizontal plane as the other rollers;

first and second mating mold halves adapted to be received on said first pluralities of supporting assemblies at one end of the respective field and to be moved on the respective assemblies in the longitudinal direction to the opposite ends of the fields;

each mold half having on the bottom thereof a plurality of elongated upright T-shaped bars inhibiting warping of the mold, the lower horizontal edges of which bars engage and roll on the rollers of a respective column as the mold moves in the field from said one end to the opposite end;

at least one spraying station in said field intermediate said one and opposite ends including means for applying a mixture of a hardenable polyester and fiberglass to the inside surfaces of the mold halves;

transfer means for receiving said T-shaped bars of respective mold halves from said first field as the mold halves reach said opposite ends of said field;

means for moving the transfer means from a first position, adjacent said opposite ends for receiving said pair of mating molds, to a second position;

means for joining the mating mold halves together after they are carried by the support structure to upright juxtaposed positions;

a mold receiving and transporting mechanism comprising a lower horizontal row of rollers for receiving and supporting joined mold halves from the transfer mechanism in its second position;

means for injecting the polyurethane foam into the interior of the joined mold halves while they are on said receiving and transporting mechanism; and means for transporting the joined mold halves from the foaming station.

* * * * *